(12) United States Patent
Burns et al.

(10) Patent No.: US 9,335,813 B2
(45) Date of Patent: May 10, 2016

(54) METHOD AND SYSTEM FOR RUN-TIME REALLOCATION OF LEAKAGE CURRENT AND DYNAMIC POWER SUPPLY CURRENT

(71) Applicant: Intel Corporation, Santa Clara, CA (US)

(72) Inventors: James S. Burns, Cupertino, CA (US); Ashish V. Choubal, Austin, TX (US); Arvind Raman, Austin, TX (US); Johan G. Van De Groenendaal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 13/903,744

(22) Filed: May 28, 2013

(65) Prior Publication Data

US 2014/0359328 A1  Dec. 4, 2014

(51) Int. Cl.
| | |
|---|---|
| *G06F 1/32* | (2006.01) |
| *G06F 1/00* | (2006.01) |
| *G06F 1/26* | (2006.01) |
| *G01R 27/00* | (2006.01) |
| *G06F 1/20* | (2006.01) |

(52) U.S. Cl.
CPC ........ *G06F 1/324* (2013.01); *G06F 1/26* (2013.01); *G06F 1/3203* (2013.01); *G06F 1/3206* (2013.01); *G06F 1/3234* (2013.01); *G06F 1/206* (2013.01); *G06F 1/329* (2013.01)

(58) Field of Classification Search
None
See application file for complete search history.

(56) References Cited

U.S. PATENT DOCUMENTS

| | | | |
|---|---|---|---|
| 2006/0047987 A1* | 3/2006 | Prabhakaran et al. | 713/322 |
| 2006/0052970 A1* | 3/2006 | Arabi et al. | 702/132 |
| 2008/0244294 A1* | 10/2008 | Allarey | 713/324 |
| 2012/0254643 A1* | 10/2012 | Fetzer et al. | 713/320 |
| 2014/0237272 A1* | 8/2014 | Sadowski | 713/320 |

* cited by examiner

*Primary Examiner* — Ji H Bae
(74) *Attorney, Agent, or Firm* — Trop, Pruner & Hu, P.C.

(57) ABSTRACT

A method and system for dynamic or run-time reallocation of leakage current and dynamic power supply current of a processor. In one embodiment of the invention, the processor uses the variation in the leakage current of the processor to reduce the maximum current dissipation or power supply current of the processor ($ICC_{max}$). By reducing the maximum current dissipation, the system cost can be reduced as a less expensive power delivery system is required in one embodiment of the invention.

18 Claims, 3 Drawing Sheets

$$210 \quad ICC_{max} = ICC_{dynamic} + ICC_{leakage}$$

$$220 \quad ICC_{max} = Voltage \times C_{dyn} \times Frequency + ICC_{leakage}$$

$$230 \quad C_{dyn} = \frac{ICC_{max} - ICC_{leakage}}{Voltage \times Frequency}$$

METHOD AND SYSTEM FOR RUN-TIME REALLOCATION OF LEAKAGE CURRENT AND DYNAMIC POWER SUPPLY CURRENT

FIELD OF THE INVENTION

This disclosure pertains to a processor, as well as code to execute thereon, and in particular but not exclusively, to a method and system for dynamic or run-time reallocation of leakage current and dynamic power supply current in the settings of a power supply current protection module in the processor.

BACKGROUND DESCRIPTION

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated.

For example, in a multi-core assembly, all the cores may operate at a common voltage and frequency point which is the maximum frequency requested by its active threads. A common performance state for all the cores in the multi-core assembly results in burning more power than necessary when they are all not equally loaded or utilized, which in turn increases the cooling costs and lowers the battery life.

Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabook™, tablets, mobile phones, processors, embedded systems, etc. become even more prevalent (from inclusion in the typical computer, automobiles, and televisions to biotechnology).

BRIEF DESCRIPTION OF THE DRAWINGS

The features and advantages of embodiments of the invention will become apparent from the following detailed description of the subject matter in which.

DETAILED DESCRIPTION

Figures 1, 2:
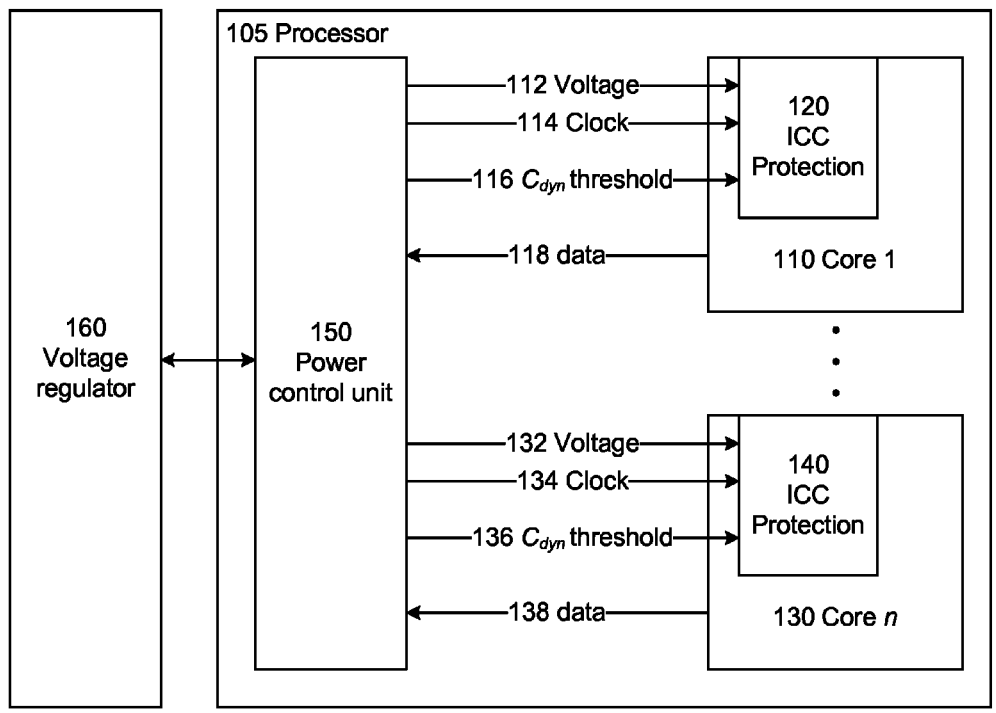
FIG. 1 illustrates the block diagram of a processor in accordance with one embodiment of the invention.
FIG. 2 illustrates the equations in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system for dynamic run-time reallocation of leakage current and dynamic power supply current of a processor. In one embodiment of the invention, the processor uses the variation in the leakage current of the processor to reduce the maximum current dissipation or power supply current of the processor ($ICC_{max}$). By reducing the maximum current dissipation, the system cost can be reduced as a less expensive power delivery system is required in one embodiment of the invention. For example, in one embodiment of the invention, with a lower maximum current dissipation of the processor, the voltage regulator that provides the supply voltage to the processor can be designed with lesser phases and a smaller power supply unit is required. Less board space is required for the system as fewer capacitors and fewer phases of the voltage regulator are required in one embodiment of the invention.

In one embodiment of the invention, the leakage current of the processor is dependent on, but is not limited to, the process corner of the processor, the temperature of the processor, the operating voltage of the processor, and the number of active processing cores in the processor. In one embodiment of the invention, a reduction in the leakage current of the processor allows more dynamic performance of the processor. In another embodiment of the invention, a reduction in the leakage current of the processor reduces the maximum current dissipation of the processor.

FIG. 1 100 illustrates the block diagram of a processor 105 in accordance with one embodiment of the invention. The processor 105 is coupled with a voltage regulator 160 that provides one or more power supply voltages to the processor 105 in one embodiment of the invention. The power supply voltages include, but are not limited to, processing core supply voltage, phase lock loop (PLL) supply voltage, Input/Output (I/O) supply voltage, analog circuit supply voltage and other voltage supplies for the operation of the processor 105.

The processor 105 has a processing core 1 110 and a power supply current (ICC) protection module or circuitry 120 in one embodiment of the invention. The ICC protection module 120 ensures that the current consumed by the processing core 110 does not exceed the maximum current dissipation limit of the processor 120 in one embodiment of the invention.

The processing core n 130 illustrates that the processor 105 may have more than one processing core in one embodiment of the invention. The processing core n similarly has an ICC protection circuit 140 in one embodiment of the invention. In one embodiment of the invention, the processor 105 has homogeneous processing cores that are of the same/similar type or performance. In another embodiment of the invention, the processor 105 has heterogeneous cores that are of different types or performance. For example, in one embodiment of the invention, the processor 105 has a high performance processing core, a low performance processing core, and a graphic processing unit to handle different loads.

The power control unit 150 of the processor 105 is coupled with the voltage regulator 160 in one embodiment of the invention. The power control unit 150 or power management unit controls the power supply delivery to all the processing cores of the processor 105. The power control unit 150 communicates with the voltage regulator by using signals such as Voltage Identifiers (VID) to adjust the supply voltage(s) provided by the voltage regulator in one embodiment of the invention.

The power control unit 150 provides a processing core supply voltage 112 and a clock signal 114 to the processing core 1 110 via the ICC protection module 120 in one embodiment of the invention. The clock signal 114 is provided by a phase locked loop (PLL not shown) in one embodiment of the invention. The ICC protection module 120 monitors a dynamic capacitance ($C_{dyn}$) of the processing core 1 110 and reduces or limits the current consumption of the processing core 1 110 when the dynamic capacitance exceeds a $C_{dyn}$ threshold 116 in one embodiment of the invention.

The ICC protection module 120 uses a number of ways to reduce or limit the current consumption of the processing core 1 110 including, but not limited to, throttling the fetch unit, throttling a rate of fetching instructions, reducing number of execution units, clock gating one or more modules in the processor, and the like.

The power control unit 150 has the ability to dynamically perform run-time reallocation of the leakage and dynamic power supply current of the processor 105 in one embodiment of the invention. This is achieved by determining the leakage current of the processor 105 to adjust the $C_{dyn}$ threshold 116. For example, in one embodiment of the invention, the processing core 1 110 provides the data 118 to the power control unit 150. The data 118 includes, but is not limited to, temperature of the processing core 1 110, process corner of the processing core 1 110, the performance or operating state (P-state) of the processing core 1 110, the low power modes or state (C-state) of the processing core 1 110, and any other information that affects the leakage current of the processor 105.

The power control unit 150 uses the data 118 provided by the processing core 1 110 to measure or compute the leakage current of the processor 105 in one embodiment of the invention. One of ordinary skill in the relevant art will readily appreciate how to determine or compute the leakage current of the processor 105 using the data 118 and shall not be described herein.

The power control unit 150 computes the $C_{dyn}$ threshold 116 and sends it to the ICC protection module 120. By doing so, the processor 105 is able to incorporate the impact of the variation in the leakage current to reduce the maximum current dissipation limit of the processor 105. This in turns reduce the demands on the voltage regulator 160 and the power supply unit (not shown in FIG. 1) in one embodiment of the invention.

FIG. 1 100 is not meant to be limiting and other configurations of the processor 105 can be used without affecting the workings of the invention. For example, in another embodiment of the invention, the voltage regulator 160 is integrated with the processor 105. In yet another embodiment of the invention, the power control unit 150 is external to the processor 105.

FIG. 2 illustrates the equations in accordance with one embodiment of the invention. For clarity of illustration, FIG. 2 is discussed with reference to FIG. 1. Equation 210 illustrates the relationship among the maximum current dissipation ($ICC_{max}$), dynamic current dissipation ($ICC_{dynamic}$) and the static current dissipation ($ICC_{leakage}$) of the processor 105. In one embodiment of the invention, equation 210 illustrates that $ICC_{max}$ of a single power supply is the sum of $ICC_{dynamic}$ and $ICC_{leakage}$ of that single power supply.

The $ICC_{max}$ is the power supply current limit and the processor 105 is not allowed to consume more than $ICC_{max}$ at any time to prevent the electrical power delivery problems from shutting down the system. The power control unit 150 and the ICC protection module 120 ensure that the current consumed by the processor 105 does not exceed $ICC_{max}$. In one embodiment of the invention, the $ICC_{max}$ of the processor 105 is determined or simulated under, but not limited to, the following conditions:

a. Maximum sustained dynamic capacitance ($C_{dyn}$), i.e., simulated by using a virus application;
b. All processing cores in active state;
c. Operating point set at the maximum turbo ratio;
d. Worst case temperature;
e. Worst case processing part processing The conditions described above are performed to induce the maximum highest possible current dissipation of the processor 105 and are not meant to be limiting. One of ordinary skill in the relevant art will readily appreciate that other ways of inducing the maximum highest possible current dissipation of the processor 105 can be performed and these other ways does not affect the workings of the invention.

Equation 210 also illustrates that for a determined $ICC_{max}$ of the processor 105, the $ICC_{dynamic}$ and $ICC_{leakage}$ can be reallocated dynamically. For example, for a fixed $ICC_{max}$, if the $ICC_{leakage}$ is reduced, more current can be allocated for $ICC_{dynamic}$, i.e., the dynamic current limit can be raised by the amount of reduction of the $ICC_{leakage}$. By facilitating dynamic reallocation of the $ICC_{dynamic}$, this allows the performance of the processor 105 to be improved in one embodiment of the invention.

Equation 220 illustrates how the $ICC_{dynamic}$ is determined in one embodiment of the invention. The $ICC_{dynamic}$ is determined from the product of the voltage of the processor 105, the $C_{dyn}$ of the processor 105, and the frequency of the processor 105. In one embodiment of the invention, the $C_{dyn}$ of the processor 105 is determined by the product of the total capacitance of the processor 105 and the switching factor of the processor 105. The $C_{dyn}$ of the processor 105 is the portion of the capacitance that is toggling which draws current and power in one embodiment of the invention.

The equation 230 rearranges the parameters of equation 220 and illustrates how the $C_{dyn}$ of the processor 105 can be determined. In one embodiment of the invention, the $C_{dyn}$ of the processor 105 is determined from the division of the result of subtracting $ICC_{leakage}$ from $ICC_{dynamic}$ by the product of voltage and frequency of the processor 105.

In one embodiment of the invention, the $ICC_{leakage}$ is monitored in real-time or during the operation of processor 105. This allows the processor 105 to perform a reallocation of the leakage current to the dynamic power supply current when there is an opportunity. In one embodiment of the invention, the power control unit 150 provides the $C_{dyn}$ of the processor 105 as illustrated in equation 230 to the ICC protection module 120 as the $C_{dyn}$ threshold 116.

The ICC protection module 120 monitors the $C_{dyn}$ of the processor core 1 110 and compares it with the $C_{dyn}$ threshold 116 provided by the power control unit 150. When the $C_{dyn}$ of the processor core 1 110 exceeds the $C_{dyn}$ threshold 116, the ICC protection module 120 is activated to protect the processing core 1 120 by limiting the current consumption of the processing core 1 120. The protection mechanism performed by the ICC protection module 120 includes, but is not limited to, throttling a rate of fetching instructions, reducing number of execution units, and clock gating one or more modules in the processor 105.

Figure 3:
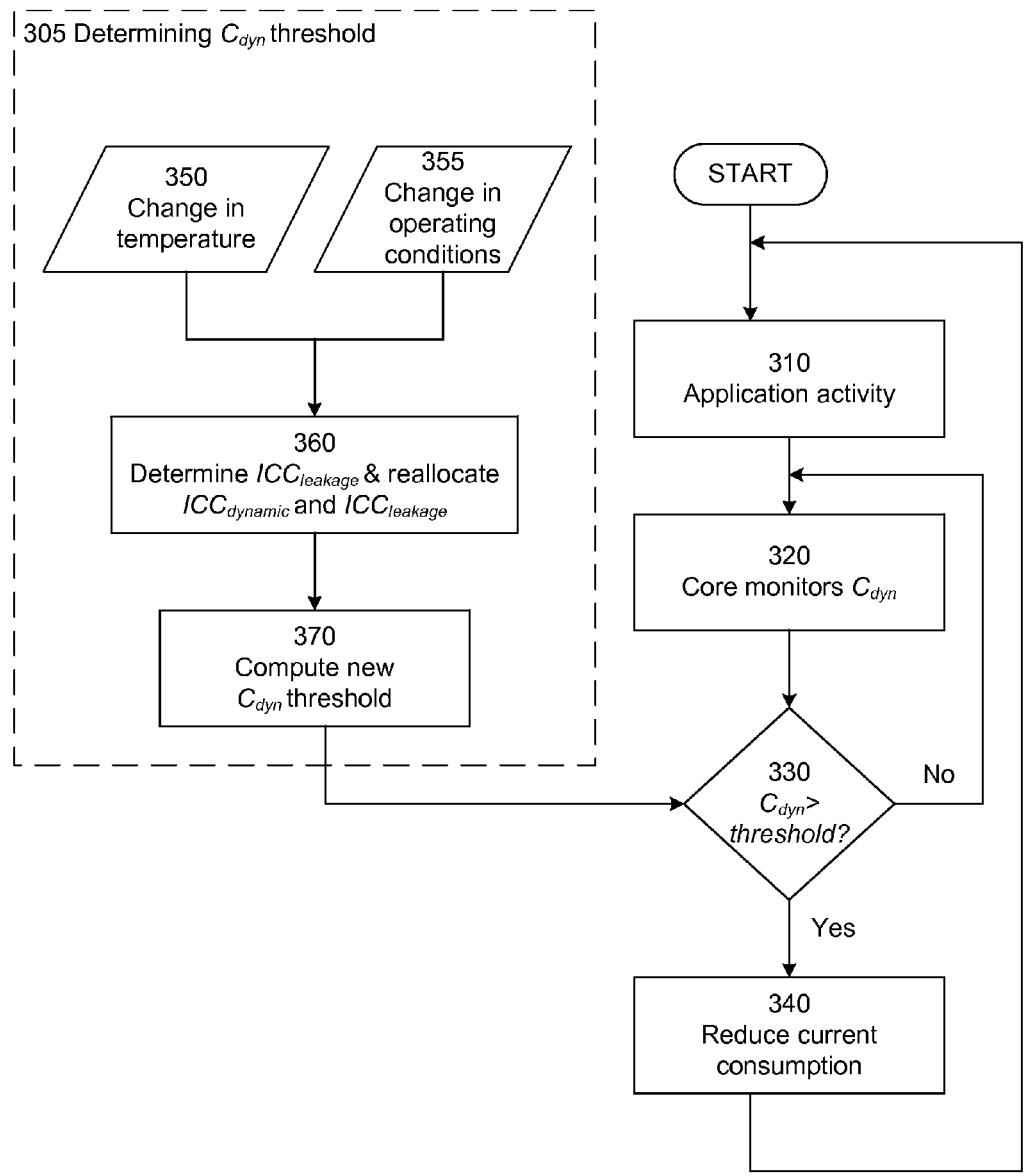
FIG. 3 illustrates a flow chart in accordance with one embodiment of the invention.

FIG. 3 illustrates a flow chart 300 in accordance with one embodiment of the invention. For clarity of illustration, FIG. 3 is discussed with references to FIGS. 1 and 2. In step 310, the processor 105 detects whether any applications are executing on the processor 105. The processing core 1 110 determines and monitors the $C_{dyn}$ of the processor core 1 110 in step 320. In step 330, the processing core 1 110 compares the $C_{dyn}$ of the processor core 1 110 with the $C_{dyn}$ threshold 116.

The step 305 of determining the $C_{dyn}$ threshold 116 is performed concurrently with the steps 310, 320, and 330 in one embodiment of the invention. In one embodiment of the invention, the step 305 of determining the $C_{dyn}$ threshold 116 is performed, but not limited to, periodically at a fixed time delay, periodically at a variable or programmable time delay, on demand by the user, and other frequency desired by the user.

In one embodiment of the invention, the step 305 of determining the $C_{dyn}$ threshold 116 comprises the steps 350, 355, 360, and 370. In step 350, the processing core 1 110 detects if there is any change in temperature of the processing core 1 350. In one embodiment of the invention, the processing core 1 110 has integrated thermal sensors to determine the temperature of the processing core 1 110. The processing core 1 110 provides the temperature information of the processing core 1 110 as the data 118 to the power control unit 150 in one embodiment of the invention.

The temperature information includes, but is not limited to, the temperature value, the temperature range, indication of a change in temperature, indication of a change in temperature above a threshold, and any other information that facilitates the power control unit 150 to determine the leakage current of the processor 105.

In step 355, the flow checks if there is any change in the operating conditions of the processor 105. The step 355 is performed by the ICC protection module 120 in one embodiment of the invention. In another embodiment of the invention, the step 355 is performed by the power control unit 150. In yet another embodiment of the invention, the step 355 is performed by the power control unit 150 and the ICC protection module 120.

The operating condition of the processor 105 includes, but is not limited to, the performance or operating state (P-state) of the processing core 1 110, the low power modes or state (C-state) of the processing core 1 110, and any other information that affects the leakage current of the processor 105. For example, in one embodiment of the invention, when the operating state or operating point of the processor 105 is changed, the supply voltage to the processor 105 is modified and this in turn impacts the leakage current $ICC_{leakage}$. In another example, when the processor core 1 110 is in a deep C-state, the supply voltage is removed and this in turn eliminates the leakage current $ICC_{leakage}$ for the processor core 1 110.

In step 360, the power control unit 150 determines the leakage current $ICC_{leakage}$ based on the information from steps 350 and 355. In one embodiment of the invention, the power control unit 150 reallocates the dynamic power supply current $ICC_{dynamic}$ and the leakage current $ICC_{leakage}$ based on the determined leakage current $ICC_{leakage}$. When there is an increase or decrease in the leakage current $ICC_{leakage}$, the power control unit 150 reallocates a corresponding decrease or increase in the dynamic power supply current limit $ICC_{dynamic}$ of the processor 105.

In step 370, the power control unit 150 computes or determines the new $C_{dyn}$ threshold 116 and provides the determined $C_{dyn}$ threshold 116 to the ICC protection module 120. The step 330 uses the $C_{dyn}$ threshold 116 to compare the current $C_{dyn}$ of the processor 105. If the $C_{dyn}$ of the processor 105 is not greater than the $C_{dyn}$ threshold 116, the flow goes back to step 310. If the $C_{dyn}$ of the processor 105 is greater than the $C_{dyn}$ threshold 116, the ICC protection circuit protects the processor 105 by limiting or reducing the current consumption of the processor 105 in step 340. The flow 300 goes back to step 310 after the current consumption is reduced or limited in step 340.

The operations illustrated in FIG. 3 are not meant to be limiting. For clarity of illustration, the flow chart 300 describes only one processing core. One of ordinary skill in the relevant art will readily how the workings of multiple processing cores and shall not be described herein. In one embodiment of the invention, the operations illustrated in FIG. 3 allow the processor core 1 110 to monitor and control the $C_{dyn}$ of the processor 105. The power control unit 150 adjusts the $C_{dyn}$ threshold 116 separately at a slower rate and the temperature of the processor 105 changes slowly. Similarly, the changes in operation conditions of the processor 105 are slower and are under control of the power control unit 150. Hence the power control unit 150 has control over the $C_{dyn}$ threshold 116. Since the power control unit 150 cannot respond fast enough to limit the dynamically changing $C_{dyn}$ of the application running on the processor, the power control unit 150 provides the $C_{dyn}$ threshold 116 to the processor core 1 110 so that it can control the $C_{dyn}$ of the processor 105 in one embodiment of the invention.

Figure 4:
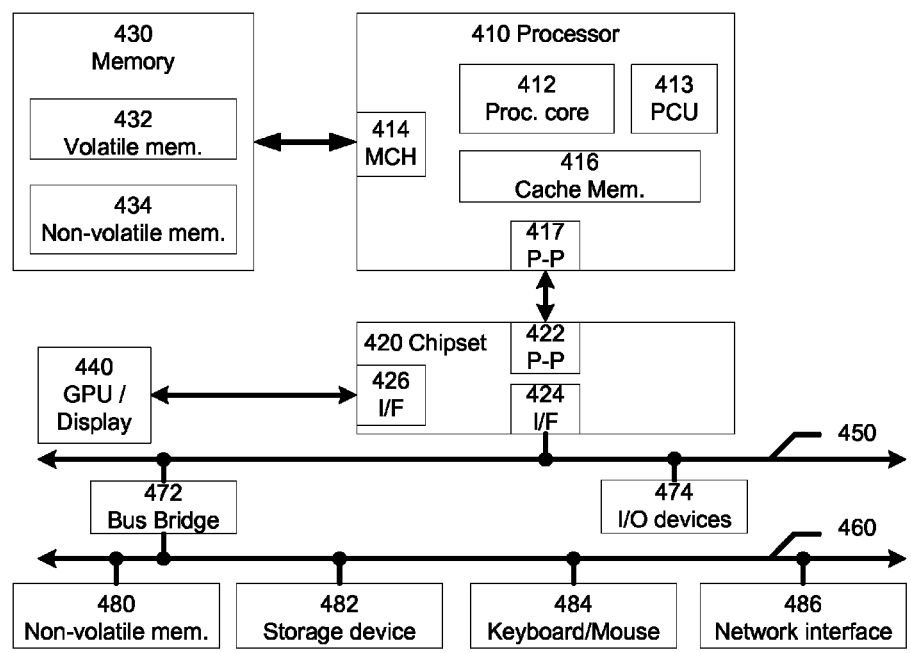
FIG. 4 illustrates a system to implement the methods disclosed herein in accordance with one embodiment of the invention.

FIG. 4 illustrates a system or platform 400 to implement the methods disclosed herein in accordance with one embodiment of the invention. The system 400 includes, but is not limited to, a desktop computer, a tablet computer, a laptop computer, a netbook, an Ultrabook™ a notebook computer, a personal digital assistant (PDA), a server, a workstation, a cellular telephone, a mobile computing device, a smart phone, an Internet appliance or any other type of computing device. In another embodiment, the system 400 used to implement the methods disclosed herein may be a system on a chip (SOC) system.

The processor 410 has a processing core 412 to execute instructions of the system 400. The processing core 412 includes, but is not limited to, fetch logic to fetch instructions, decode logic to decode the instructions, execution logic to execute instructions and the like. The processor 410 has a cache memory 416 to cache instructions and/or data of the system 400. In another embodiment of the invention, the cache memory 416 includes, but is not limited to, level one, level two and level three, cache memory or any other configuration of the cache memory within the processor 410.

The memory control hub (MCH) 414 performs functions that enable the processor 410 to access and communicate with a memory 430 that includes a volatile memory 432 and/or a non-volatile memory 434. The volatile memory 432 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 434 includes, but is not limited to, NAND flash memory, phase change memory (PCM), read only memory (ROM), electrically erasable programmable read only memory (EEPROM), or any other type of non-volatile memory device.

The memory 430 stores information and instructions to be executed by the processor 410. The memory 430 may also stores temporary variables or other intermediate information while the processor 410 is executing instructions. The chipset 420 connects with the processor 410 via Point-to-Point (PtP) interfaces 417 and 422. The chipset 420 enables the processor 410 to connect to other modules in the system 400. In another embodiment of the invention, the chipset 420 is a platform controller hub (PCH) 413. In one embodiment of the invention, the power control unit 150 is integrated in the platform controller hub 420. In another embodiment of the invention, the power control unit 150 is integrated in the processor 410 (not shown in FIG. 4) but is not part of PCH 413.

In one embodiment of the invention, the interfaces 417 and 422 operate in accordance with a PtP communication protocol such as the Intel® QuickPath Interconnect (QPI) or the like. The chipset 420 connects to a GPU or a display device 440 that includes, but is not limited to, liquid crystal display (LCD), cathode ray tube (CRT) display, or any other form of visual display device. In another embodiment of the invention, the GPU 440 is not connected to the chipset 420 and is part of the processor 410 (not shown).

In addition, the chipset 420 connects to one or more buses 450 and 460 that interconnect the various modules 474, 480, 482, 484, and 486. Buses 450 and 460 may be interconnected together via a bus bridge 472 if there is a mismatch in bus speed or communication protocol. The chipset 420 couples with, but is not limited to, a non-volatile memory 480, a mass storage device(s) 482, a keyboard/mouse 484 and a network interface 486. The mass storage device 482 includes, but is not limited to, a solid state drive, a hard disk drive, an universal serial bus flash memory drive, or any other form of computer data storage medium. The network interface 486 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 4 are depicted as separate blocks within the system 400, the functions performed by some of these blocks may be integrated within a single semiconductor circuit or may be implemented using two or more separate integrated circuits. The system 400 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc., is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A processor comprising:
a processing core comprising a protection circuit;
a power control unit coupled with the protection circuit, wherein the power control unit is programmed to provide a dynamic capacitance threshold based at least in part on a leakage current of the processor and a maximum current dissipation of the processor.

2. The processor of claim 1, wherein the protection circuit is programmed to:
determine whether a dynamic capacitance of the processor exceeds the dynamic capacitance threshold; and
reduce current consumption of the processing core in response to the determination that the dynamic capacitance of the processor has exceeded the dynamic capacitance threshold.

3. The processor of claim 2, wherein the protection circuit programmed to reduce the current consumption of the processing core in response to the determination that the dynamic capacitance of the processor has exceeded the dynamic capacitance threshold is to perform one or more of a rate throttle of instruction fetch, a reduced number of execution units, and a clock gate of one or more modules in the processor.

4. The processor of claim 2, wherein the maximum current dissipation of the processor is a sum of a dynamic power supply current limit and the leakage current of the processor, and wherein the dynamic power supply current limit is a product of an operating voltage of the processor, the dynamic capacitance, and a clock frequency of the processor.

5. The processor of claim 4, wherein the processor is to determine the leakage current based on one or more of a temperature information of the processor, the operating voltage of the processor, and a number of active processing cores of the processor.

6. The processor of claim 5, wherein the temperature information comprises one or more of a temperature value, a temperature range, an indication of a change in temperature, an indication of a change in temperature above a threshold, of the processor.

7. A system comprising:
a voltage regulator to provide one or more voltages;
a processor coupled with the voltage regulator, the processor comprising:
a processing core comprising a protection circuit;
a power control unit coupled with the protection circuit, wherein the power control unit is programmed to provide a dynamic capacitance threshold based at least in part on a leakage current of the processor and a maximum current dissipation of the processor.

8. The system of claim 7, wherein the protection circuit is programmed to:
determine whether a dynamic capacitance of the processor exceeds the dynamic capacitance threshold; and
reduce current consumption of the processing core in response to the determination that the dynamic capacitance of the processor has exceeded the dynamic capacitance threshold.

9. The system of claim 8, wherein the protection circuit programmed to reduce the current consumption of the processing core in response to the determination that the dynamic capacitance of the processor has exceeded the dynamic capacitance threshold is to perform one or more of a rate throttle of instruction fetch, a reduced number of execution units, and a clock gate of one or more modules in the processor.

10. The system of claim 8, wherein the maximum current dissipation of the processor is a sum of a dynamic power supply current limit and the leakage current of the processor, and wherein the dynamic power supply current limit is a product of an operating voltage of the processor, the dynamic capacitance, and a clock frequency of the processor.

11. The system of claim 10, wherein the processor is to determine the leakage current based on one or more of a temperature information of the processor, the operating voltage of the processor, and a number of active processing cores of the processor.

12. The system of claim 11, wherein the temperature information comprises one or more of a temperature value, a temperature range, an indication of a change in temperature, an indication of a change in temperature above a threshold, of the processor.

13. A method comprising:
determining a leakage current of a processor based on one or more of a temperature information of the processor and an operating condition of the processor;
reallocating a dynamic power supply current limit of the processor based at least in part on the determined leakage current; and
determining a dynamic capacitance threshold based at least in part on the reallocated dynamic power supply current limit and the determined leakage current.

14. The method of claim 13, further comprising:
determining whether a dynamic capacitance of the processor exceeds the dynamic capacitance threshold; and
reducing current consumption of the processor in response to the determination that the dynamic capacitance of the processor has exceeded the dynamic capacitance threshold.

15. The method of claim 14, wherein reducing the current consumption of the processor comprises performing one or more of throttling a rate of fetching instructions, reducing a number of execution units, and clock gating one or more modules in the processor.

16. The method of claim 13, wherein the reallocated dynamic power supply current limit is a product of a voltage of the processor, a clock frequency of the processor, and the dynamic capacitance threshold.

17. The method of claim 16, wherein the dynamic capacitance threshold is a division of, a result of subtracting the determined leakage current from the reallocated dynamic power supply current limit, by the product of the voltage and the clock frequency of the processor.

18. The method of claim 13, wherein the temperature information comprises one or more of a temperature value, a temperature range, an indication of a change in temperature, an indication of a change in temperature above a threshold, of the processor.

* * * * *